(12) United States Patent
Aiello

(10) Patent No.: US 9,364,030 B1
(45) Date of Patent: Jun. 14, 2016

(54) HEATED BRA WITH A GPS MODULE

(71) Applicant: Janet Aiello, Westerly, RI (US)

(72) Inventor: Janet Aiello, Westerly, RI (US)

( * ) Notice: Subject to any disclaimer, the term of this patent is extended or adjusted under 35 U.S.C. 154(b) by 0 days.

(21) Appl. No.: 14/881,276

(22) Filed: Oct. 13, 2015

(51) Int. Cl.
| | |
|---|---|
| *A41C 3/12* | (2006.01) |
| *A41C 3/00* | (2006.01) |
| *H04W 4/02* | (2009.01) |
| *H04W 4/00* | (2009.01) |
| *A41D 13/005* | (2006.01) |

(52) U.S. Cl.
CPC . *A41C 3/005* (2013.01); *A41C 3/12* (2013.01); *A41D 13/0051* (2013.01); *H04W 4/008* (2013.01); *H04W 4/02* (2013.01)

(58) Field of Classification Search
CPC ......... A41C 1/00; A41C 3/00; A41D 13/0051
USPC .............. 450/1, 54–57, 37, 39; 2/69
See application file for complete search history.

(56) References Cited

U.S. PATENT DOCUMENTS

| | | | |
|---|---|---|---|
| 3,084,241 A | 4/1963 | Carrona | |
| 3,241,715 A * | 3/1966 | Murray | B67D 7/163 222/20 |
| 5,050,595 A * | 9/1991 | Krafft | A61F 7/007 450/38 |
| 5,235,974 A | 8/1993 | Miller | |
| 5,507,794 A | 4/1996 | Allen | |
| 5,977,517 A | 11/1999 | Grosjean | |
| 6,464,717 B1 * | 10/2002 | Smith | A61F 7/02 450/58 |
| 7,275,977 B1 * | 10/2007 | Rhodes | A41C 3/0064 450/38 |
| 7,309,275 B1 * | 12/2007 | Morales | A41C 3/02 450/38 |
| D608,979 S | 2/2010 | Wayns | |
| 2006/0154566 A1 * | 7/2006 | Nunez | A41C 3/0064 450/37 |

FOREIGN PATENT DOCUMENTS

WO      WO03028408 A1    4/2003

* cited by examiner

*Primary Examiner* — Gloria Hale
(74) *Attorney, Agent, or Firm* — Kyle A. Fletcher, Esq.

(57) ABSTRACT

The heated bra with a GPS module is a brassiere that further comprises a heating device and a GPS module. The heating device is used to heat the brassiere during cold weather for the comfort of the user. The GPS module is used to track the location of the wearer and to relay the position to mapping software on a PDA. The heated bra with a GPS module comprises a brassiere, a heating device, and a controller.

18 Claims, 6 Drawing Sheets

HEATED BRA WITH A GPS MODULE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of foundation garments, more specifically, a heated brassiere configured with a GPS module.

SUMMARY OF INVENTION

The heated bra with a GPS module is a brassiere that further comprises a heating device and a GPS module. The heating device is used to heat the brassiere during cold weather for the comfort of the user. The GPS module is used to track the location of the wearer and to relay the position to mapping software on a PDA. It shall be noted that the term GPS is being used to refer to a global positioning system. It shall be further noted that the term PDA is being used to refer to a personal digital assistant.

These together with additional objects, features and advantages of the heated bra with a GPS module will be readily apparent to those of ordinary skill in the art upon reading the following detailed description of the presently preferred, but nonetheless illustrative, embodiments when taken in conjunction with the accompanying drawings.

In this respect, before explaining the current embodiments of the heated bra with a GPS module in detail, it is to be understood that the heated bra with a GPS module is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the heated bra with a GPS module.

It is therefore important that the claims be regarded as including such equivalent construction insofar as they do not depart from the spirit and scope of the heated bra with a GPS module. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
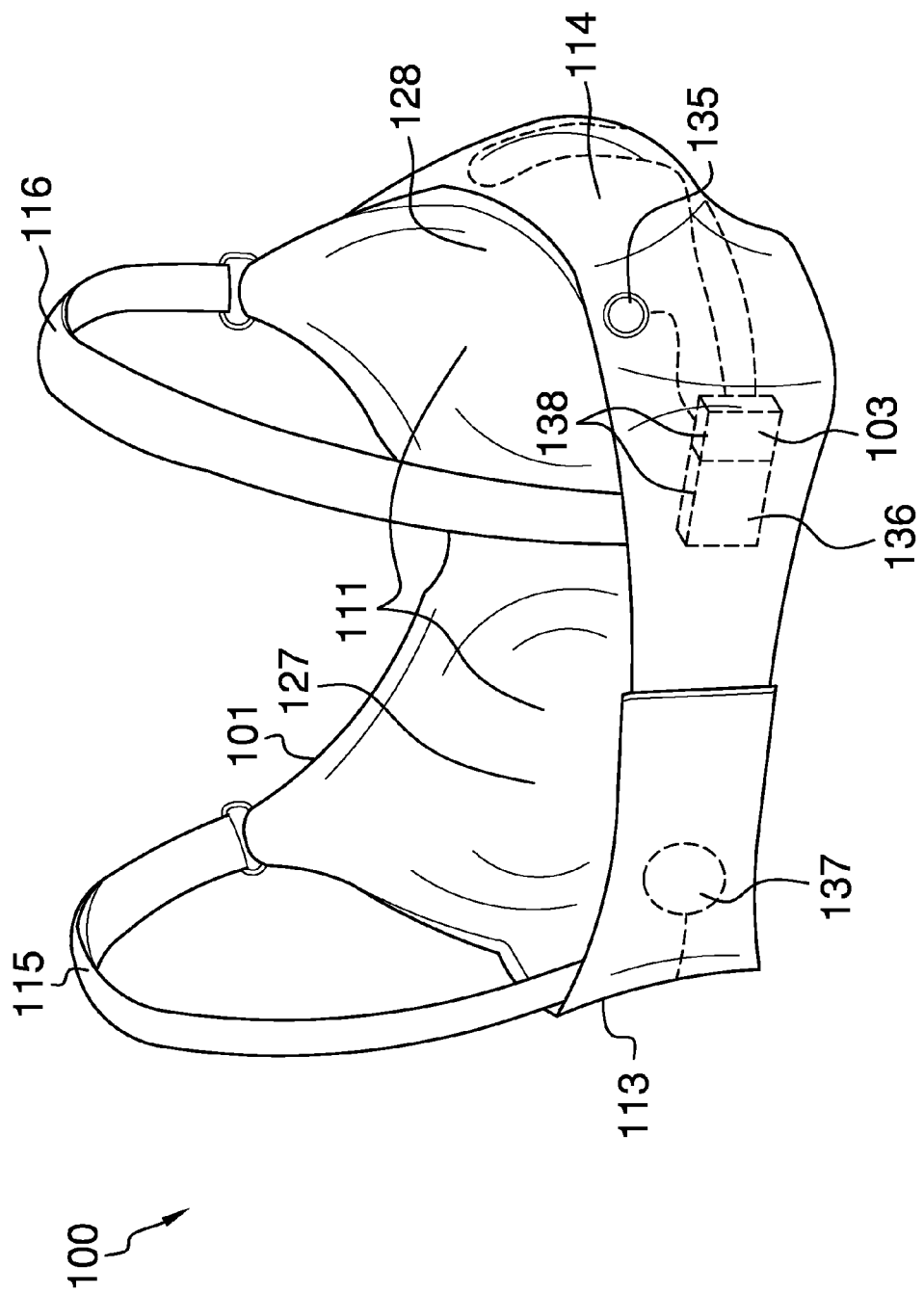
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implements. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 6. The heated bra with a GPS module 100 (hereinafter invention) comprises a brassiere 101, a heating device 102, and a controller 103.

The brassiere 101 further comprises a plurality of cups 111, a bridge 112, a left wing 113, a right wing 114, a left strap 115, a right strap 116, and a fastener 117. The plurality of cups 111 further comprises a left cup 127 and a right cup 128. The left cup 127 and the right cup 128 are joined in the front of the wearer 141 by a piece of fabric called the bridge 112. The left wing 113 is a piece of fabric that is further defined with a first end 161 and a second end 162. The first end 161 attaches to the left side of the left cup 127 and wraps around the left side of the wearer 141. The first part of the fastener 117 attaches to the second end 162. The right wing 114 is a piece of fabric that is further defined with a third end 163 and a fourth end 164. The third end 163 attaches to the right side of the right cup 128 and wraps around the right side of the wearer 141. The second part of the fastener 117 attaches to the fourth end 164. The fastener 117 is used to join the second end 162 and the fourth end 164 on the back side of the wearer 141. The left strap 115 supports the brassiere 101 on the left shoulder of the wearer 141. The left strap 115 is further defined with a fifth end 165 and a sixth end 166. The fifth end 165 attaches to the top of the left cup 127. The sixth end 166 attaches to the left wing 113. The right strap 116 supports the brassiere 101 on the right shoulder of the wearer 141. The right strap 116 is further defined with a seventh end 167 and an eighth end 168. The seventh end 167 attaches to the top of the right cup 128. The eighth end 168 attaches to the right wing 114.

Figure 2:
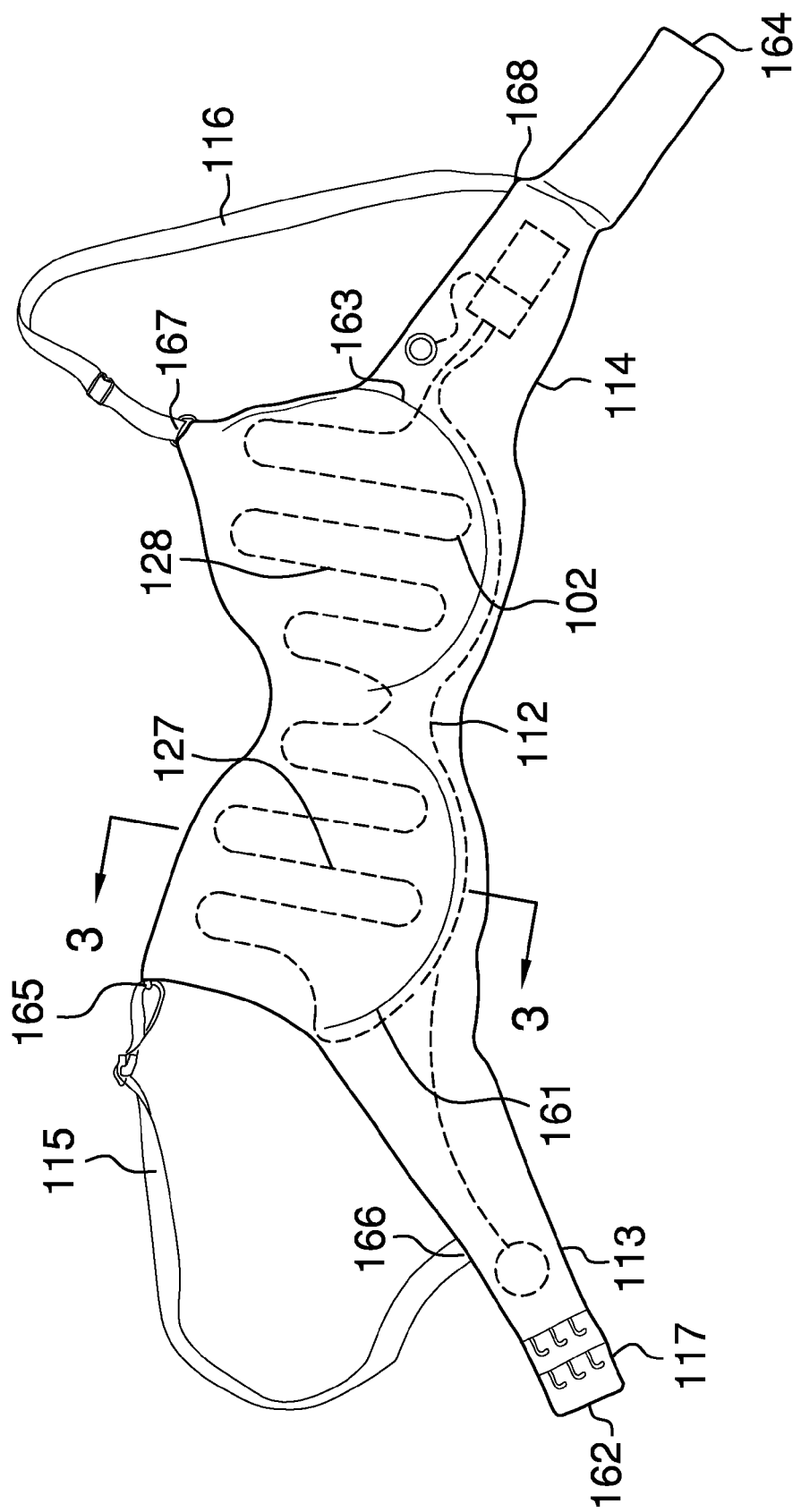
FIG. 2 is a front view of an embodiment of the disclosure.
Figure 3:
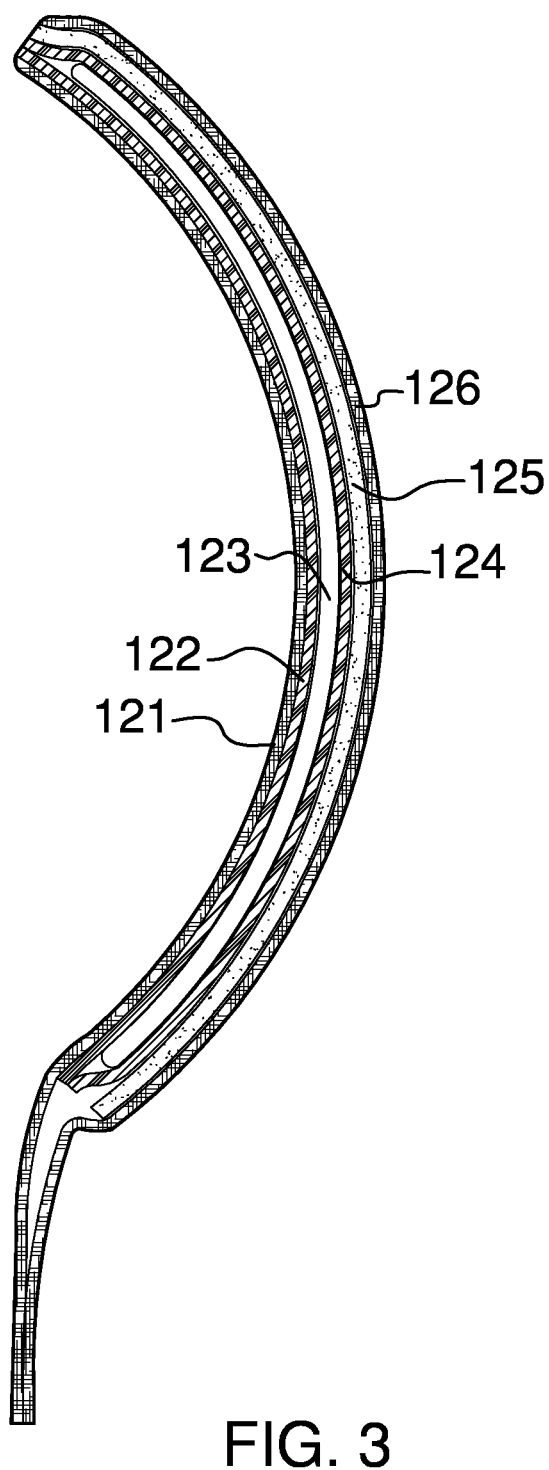
FIG. 3 is a cross-sectional view of an embodiment of the disclosure across 3-3.
Figure 4:
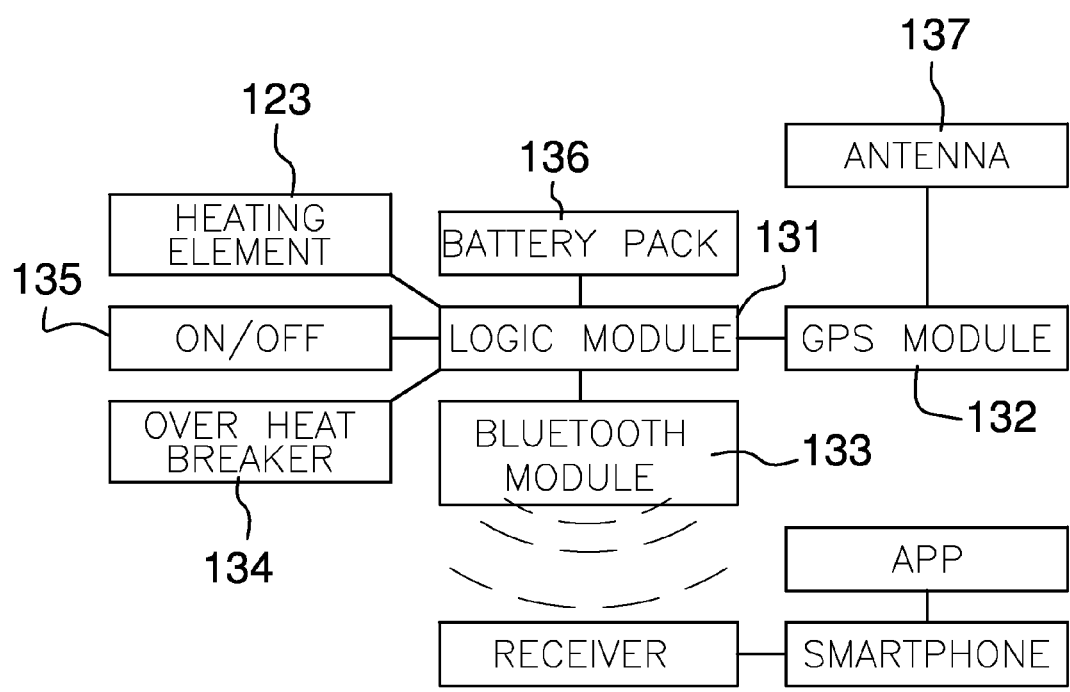
FIG. 4 is a block diagram view of an embodiment of the disclosure.
Figure 5:
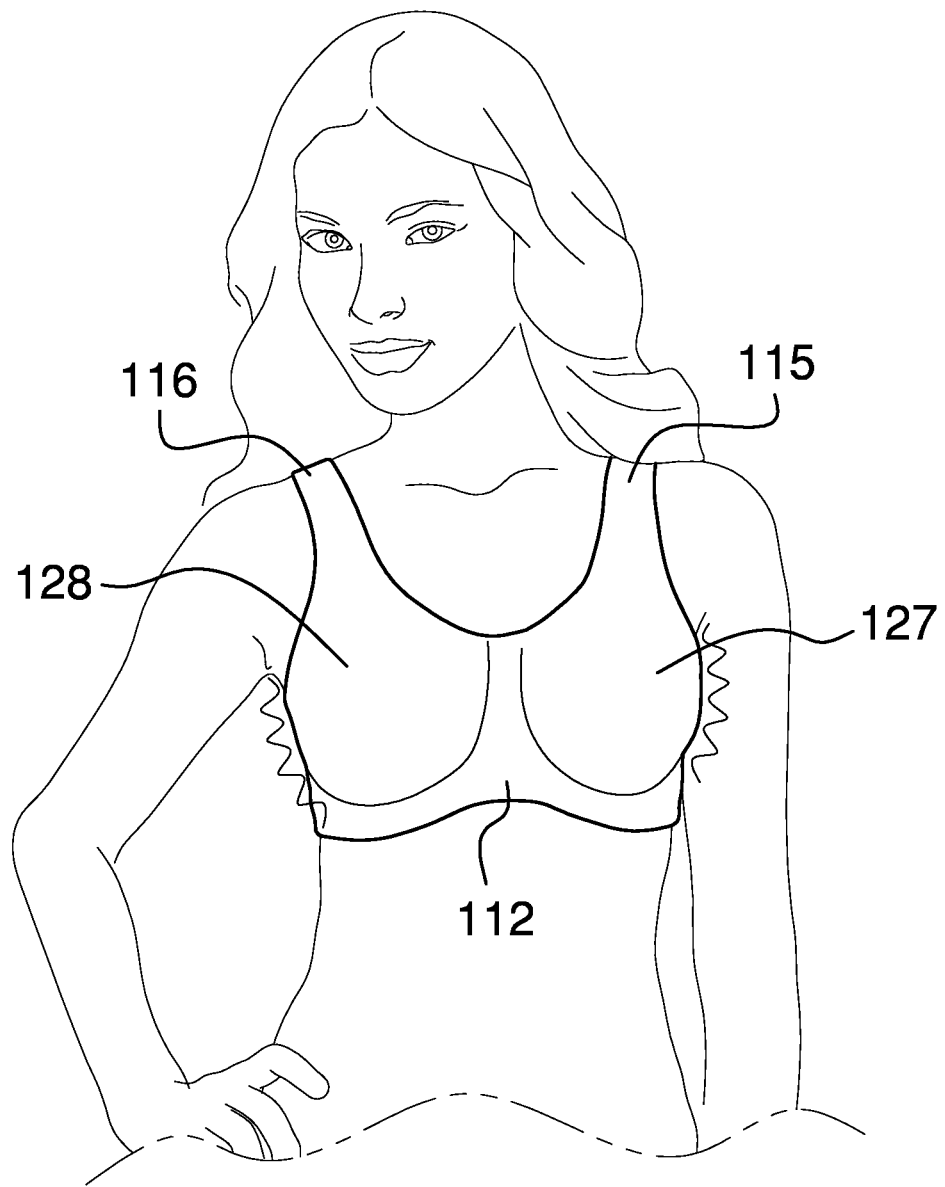
FIG. 5 is an in use view of an embodiment of the disclosure.

Each of the plurality of cups 111 further comprises an inner liner 121, an inner insulation 122, a heating element 123, an outer insulation 124, and an outer liner 126. The inner liner 121 is a satin and is positioned such that it rests against the skin of the user. On the side of the inner liner 121 distal from the skin is placed the inner insulation 122. The inner insulation 122 is a thermally insulating material that prevents the skin and the inner liner 121 from being burned by the heating element 123. On the side of the inner insulation 122 distal from the inner liner 121 is the heating element 123. The heating element 123 is commercially available. As shown in FIG. 2, the heating element 123 is laid out using a series of hairpin curves to provide heat through the entire cup of the bra. On the side of the heating element 123 that is distal from the inner insulation 122 is placed the outer insulation 124. The outer insulation 124 is a thermally insulating material that prevents the heating element 123 from burning the padding 125, the outer liner 126, or a person touching the brassiere 101. On the side of the outer insulation 124 that is distal from the heating element 123 is placed the padding 125, which is a soft material that helps to form the shape of the brassiere 101. The padding 125 is covered with the outer liner 126. The outer liner 126 is a textile.

The controller 103 further comprises a logic module 131, a GPS module 132 and a Bluetooth module 133. The logic module 131 is a microcontroller that controls the GPS module 132, the Bluetooth module 133, and the logical functions described in this paragraph. The GPS module 132 uses the GPS to track the position of the brassiere 101 using the GPS antenna 137. The logic module 131 queries the GPS module 132 for the position of the brassiere 101. The logic module 131 also instructs the Bluetooth module 133 to establish a Bluetooth connection with a PDA associated with the invention 100 and uses the Bluetooth connection to forward the position of the brassiere 101 to the PDA. The on off switch 135 controls the operation of the logic module 131, the GPS module 132 and the Bluetooth module 133 by controlling the power supplied to the logic module 131, the GPS module 132 and the Bluetooth module 133 by the battery 136.

With the exception of the GPS antenna 137, the controller 103 and battery 136 are contained in a housing 138 attached to the right wing 114 of the brassiere 101. The GPS antenna 137 is a commercially available GPS antenna attached to the left wing 113 of the brassiere 101. The on off switch 135 is attached to the right wing 114 of the brassiere 101.

Figure 6:
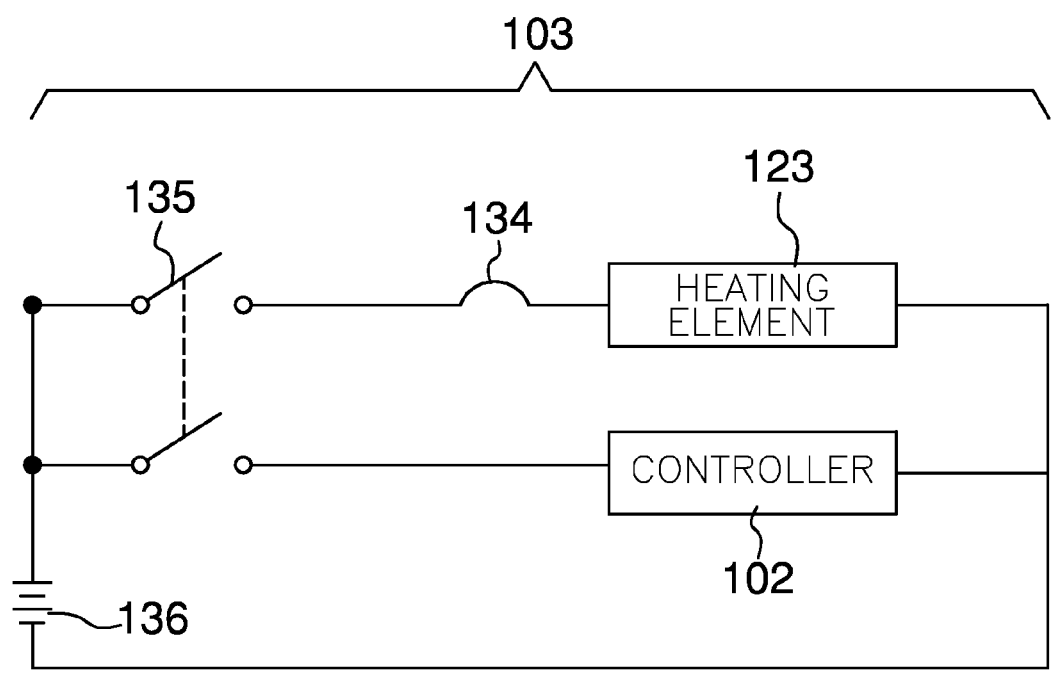
FIG. 6 is a schematic view of an embodiment of the disclosure.

As shown in FIG. 6, the heating device 102 comprises the heating element 123, the on off switch 135, a thermal breaker 134, and the battery 136. The heating element 123 and the battery 136 are described elsewhere in this disclosure. The on off switch 135 is a single pole double throw switch that is used to control the controller 103 and the heating device 102. The interaction of the on off switch 135 with the controller 103 is described elsewhere in this disclosure. The on off switch 135 is used in the heating device 102 to control the flow of electricity from the battery 136 to the heating element 123. The thermal breaker 134 monitors the temperature of the heating element 123 and will disconnect the electric circuit between the battery 136 and the heating element 123 should the temperature of the heating element 123 exceed a predetermined temperature.

To use the invention 100, the brassiere 101 is put on normally. To initiate the heating device 102 and the controller 103, the on off switch 135 is placed in the on position. To deactivate the heating device 102 and the controller 103, the on off switch 135 is placed in the off position.

The following definitions and directional references were used in this disclosure:

Battery: As used in this disclosure, a battery is a container consisting of one or more cells, in which chemical energy is converted into electricity and used as a source of power.

Fastener: As used in this disclosure, a fastener is a device that is used to join or affix two objects. Fasteners generally comprise a first part which is attached to the first object and a second part which is attached to the second object.

GPS: As used in this definition, depending on the context GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Heating element: As used in this disclosure, a heating element is a resistive wire that is used to convert electrical energy into heat.

Housing: As used in this disclosure, a housing is a rigid casing that encloses and protects one or more devices.

Logic Module: As used in this disclosure, a logic module is a programmable device that accepts digital and analog inputs, processes the digital and analog inputs according to previously stored instruction and to provide the results of these instructions as digital or analog outputs.

Microcontroller: As used in this disclosure, a microcontroller is a small computer, often on a single integrated circuit, containing a processor core, memory, and programmable input/output peripherals.

Padding: As used in this disclosure, a pad is a mass of soft material used as a filling.

PDA: As used in this disclosure, a PDA is a handheld device that is used for managing personal information and communication. Examples of PDAs include, but are not limited to, cellular phones, tablets and smart phones.

Satin: As used in this disclosure, a satin is a smooth textile made using a satin weave.

Satin Weave: As used in this disclosure, a satin weave is a weaving pattern in which the face of the fabric is formed almost completely of warp end or weft floats that are produced in the repeat of the weave. The weave produced a characteristic smooth surface on at least one face of the fabric. The satin weave is considered one of the basic weaving patterns. As used in this disclosure satin weaves may be combined with other weave patterns to improve the satin performance characteristics, such as elongation or abrasion resistance, so long as the characteristic smooth surface is maintained.

Textile: As used in this disclosure, a textile is a material that is woven, knitted, or felted. Synonyms in common usage for this definition include fabric and cloth.

Directional References: In this disclosure, directional reference correspond to the directional reference of the wearer. For example, left means towards the left side of the wearer, top means towards the head of the wearer, and front means towards the front side of the wearer.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A heated foundation garment comprising:
a brassiere, a heating device, and a controller;
wherein the heating device warms the brassiere;
wherein the controller monitors a global positioning system location of the brassiere, thereby to locate the wearer;
wherein the controller communicates the global positioning system location of the brassiere with a personal digital assistant.

2. The according to claim 1 wherein the brassiere further comprises a plurality of cups, a bridge, a left wing, a right wing, a left strap, a right strap, and a fastener.

3. The according to claim 2 wherein the heating device comprises a heating element, the on off switch, a thermal breaker, and a battery.

4. The according to claim 3 wherein each of the plurality of cups further comprises an inner liner, an inner insulation, a heating element, an outer insulation, and an outer liner.

5. The according to claim 4 wherein the inner liner is a satin that is positioned such that it rests against the skin of the user.

6. The according to claim 5 wherein on the side of the inner liner distal from the skin is placed the inner insulation.

7. The according to claim 6 wherein the inner insulation is made from a thermally insulating material.

8. The according to claim 7 wherein on the side of the inner insulation distal from the inner liner is the heating element.

9. The according to claim 8 wherein the heating element is laid out using a series of hairpin curves.

10. The according to claim 9 wherein on the side of the heating element that is distal from the inner insulation is placed the outer insulation.

11. The according to claim 10 wherein the outer insulation is a thermally insulating material.

12. The according to claim 11 wherein on the side of the outer insulation that is distal from the heating element is placed the padding.

13. The according to claim 12 wherein the padding is covered with the outer liner.

14. The according to claim 13 wherein the controller further comprises a logic module, a global positioning system module and a Bluetooth module.

15. The according to claim 14 wherein the logic module is a microcontroller;
wherein the logic module controls the global positioning system module and the Bluetooth module;
wherein the global positioning system module provides the microcontroller with the global positioning system position of the brassiere;
wherein the Bluetooth module receives the global positioning system position of the brassiere and communicates the global positioning system position of the brassiere to the personal digital assistant.

16. The according to claim 15 wherein the on off switch is a single pole double throw switch that is used to control power to the controller and the heating device.

17. The according to claim 16 wherein the thermal breaker is placed in series between the heating element and the battery.

18. The according to claim 17 wherein the controller and battery are contained in a housing.

* * * * *